(12) United States Patent
Choi et al.

(10) Patent No.: US 10,696,858 B2
(45) Date of Patent: Jun. 30, 2020

(54) INK COMPOSITION FOR STEEL MATERIAL, HAVING EXCELLENT ADHESION, METHOD FOR MANUFACTURING PRINTED STEEL SHEET BY USING SAME, AND PRINTED STEEL SHEET MANUFACTURED THEREBY

(71) Applicants: POSCO, Pohang-si (KR); INKTEC CO., LTD., Ansan-si (KR)

(72) Inventors: Ha-Na Choi, Gwangyang-si (KR); Kyung-Pyo Yu, Ansan-si (KR); Jin-Tae Kim, Gwangyang-si (KR); Chan-Hee Park, Ansan-si (KR); Jung-Hwan Lee, Gwangyang-si (KR); Yon-Kyun Song, Gwangyang-si (KR)

(73) Assignees: POSCO, Pohang-si (KR); INKTEC CO., LTD., Gyeonggi-Do (KR)

( * ) Notice: Subject to any disclaimer, the term of this patent is extended or adjusted under 35 U.S.C. 154(b) by 39 days.

(21) Appl. No.: 16/064,167

(22) PCT Filed: Dec. 21, 2016

(86) PCT No.: PCT/KR2016/015049
§ 371 (c)(1),
(2) Date: Jun. 20, 2018

(87) PCT Pub. No.: WO2017/111476
PCT Pub. Date: Sep. 29, 2017

(65) Prior Publication Data
US 2019/0002718 A1    Jan. 3, 2019

(30) Foreign Application Priority Data

Dec. 23, 2015 (KR) ........................ 10-2015-0185491

(51) Int. Cl.
| C09D 11/38 | (2014.01) |
| C09D 4/00 | (2006.01) |
| C09D 7/40 | (2018.01) |
| C08F 220/20 | (2006.01) |
| C08F 220/30 | (2006.01) |
| C09D 7/63 | (2018.01) |
| C09D 11/101 | (2014.01) |
| C09D 11/102 | (2014.01) |

(52) U.S. Cl.
CPC ............ *C09D 11/38* (2013.01); *C08F 220/20* (2013.01); *C08F 220/30* (2013.01); *C09D 4/00* (2013.01); *C09D 7/40* (2018.01); *C09D 7/63* (2018.01); *C09D 11/101* (2013.01); *C09D 11/102* (2013.01)

(58) Field of Classification Search
CPC ....... C08L 63/10; C08K 75/14; C09D 163/10; C09D 151/08; C09D 175/14; C09D 175/16; C09D 11/00; C09D 11/101; C09D 11/10; C09D 11/106; C09D 11/107; C09D 163/00; C09D 167/00; C09D 167/07; C09D 175/00; G03F 7/027; G03F 7/028
USPC .............. 522/92, 96, 98, 103, 104, 107, 170
See application file for complete search history.

(56) References Cited

U.S. PATENT DOCUMENTS

| 5,616,364 A * | 4/1997 | Cleary ................ C09D 11/107 427/288 |
| 7,220,786 B1 | 5/2007 | Boldt |
| 8,921,501 B2 * | 12/2014 | Kim .................... C08F 283/008 428/216 |
| 9,034,937 B2 * | 5/2015 | Yoo ......................... C09D 5/14 428/423.1 |
| 2008/0090931 A1 | 4/2008 | Nagvekar et al. |
| 2010/0221552 A1 | 9/2010 | Ishida et al. |
| 2011/0201718 A1* | 8/2011 | Naitou ..................... C08F 2/48 522/34 |
| 2011/0250415 A1 | 10/2011 | Kim et al. |
| 2012/0295076 A1 | 11/2012 | Toyoda et al. |
| 2014/0311779 A1 | 10/2014 | Furusho et al. |
| 2015/0167706 A1 | 6/2015 | Legros et al. |
| 2016/0108277 A1* | 4/2016 | Kim ........................ C09D 5/00 428/423.1 |

(Continued)

FOREIGN PATENT DOCUMENTS

| CN | 105017854 | 11/2015 |
| EP | 2377901 | 10/2011 |

(Continued)

OTHER PUBLICATIONS

European Search Report—European Application No. 16879343.8, dated Nov. 30, 2018, citing EP 2 377 901, U.S. Pat No. 7,220,786, CN 105 017 854, and WO 99/29787.

(Continued)

*Primary Examiner* — Sanza L. McClendon
(74) *Attorney, Agent, or Firm* — Cantor Colburn LLP

(57) ABSTRACT

An ink composition for a printed steel sheet, having excellent adhesion to a steel sheet, processability, solvent resistance, and the like, a method for manufacturing a printed steel sheet using the same, and a printed steel sheet manufactured thereby, are provided. The ink composition for a steel material includes 10 to 30 parts by weight of a mixture of a urethane acrylate oligomer and another type of acrylate oligomer different from the urethane acrylate oligomer, 65 to 80 parts by weight of a radiation curable monomer which is a mixture of a monofunctional radiation curable monomer and a di- or more functional radiation curable monomer, 1 to 10 parts by weight of a photoinitiator, and 0.01 to 10 parts by weight of an adhesion promoter.

20 Claims, No Drawings

(56) References Cited

U.S. PATENT DOCUMENTS

2018/0230323 A1 8/2018 Kim et al.

FOREIGN PATENT DOCUMENTS

| | | |
|---|---|---|
| JP | 08048923 | 2/1996 |
| JP | 10060066 | 3/1998 |
| JP | 2003313489 | 11/2003 |
| JP | 2010506966 | 3/2010 |
| JP | 2012514659 | 6/2012 |
| JP | 2012162688 | 8/2012 |
| JP | 2012255143 | 12/2012 |
| JP | 2013129746 | 7/2013 |
| JP | 2014122310 | 7/2014 |
| JP | 2014129481 | 7/2014 |
| JP | 2015527926 | 9/2015 |
| JP | 2015193229 | 11/2015 |
| JP | 2018532001 | 11/2018 |
| KR | 100722805 | 5/2007 |
| KR | 100725249 | 6/2007 |
| KR | 20100071514 | 6/2010 |
| KR | 20100073809 | 7/2010 |
| KR | 101118570 | 2/2012 |
| KR | 101403769 | 6/2014 |
| KR | 20140092847 | 7/2014 |
| KR | 20140141109 | 12/2014 |
| WO | 9929787 | 6/1999 |
| WO | 2007116704 | 10/2007 |

OTHER PUBLICATIONS

Japanese Office Action—Japanese Application No. 2018-533678 dated Aug. 27, 2019, citing JP 2015-193229, JP 2012-514659, JP 2010/506966, JP 2014-129481, JP 2014-122310, JP 2013-129746, JP 2003-129746, JP 2003-313489, JP 2015-527926, JP 2012-162688, JP 2012-255143, JP 08-048923, JP 10-060066 and JP 2018-532001.

* cited by examiner

INK COMPOSITION FOR STEEL MATERIAL, HAVING EXCELLENT ADHESION, METHOD FOR MANUFACTURING PRINTED STEEL SHEET BY USING SAME, AND PRINTED STEEL SHEET MANUFACTURED THEREBY

TECHNICAL FIELD

The present disclosure relates to an ink composition for a steel material, a method for manufacturing a printed steel sheet using the same, and a printed steel sheet manufactured thereby. More particularly, the present disclosure relates to an ink composition for a printed steel sheet, having excellent adhesion to a steel sheet, processability, solvent resistance, and the like, relates to a method for manufacturing a printed steel sheet using the same, and relates to a printed steel sheet manufactured thereby.

BACKGROUND ART

Existing printed steel sheets have been produced by a silk screen method, a roll printing method, or a laminating method. However, it is impossible to print a high resolution pattern using such a conventional printing method. In addition, the conventional printing method has disadvantages of an increase in the production cost due to production of a screen or a roll, of a low error rate, and of an impossibility to produce products of various colors. To solve an issue of the conventional printing method, an attempt has been made to apply a conventional inkjet printing method to steel to compensate for disadvantages of an existing printed steel sheet manufacturing method.

However, since when ink is jetted directly onto a steel material, it is difficult to ensure adhesion between the ink and the steel material due to an absence of an absorption layer, utilization as a product is impossible. In addition, when conventional ink is applied to a steel material by inkjet jetting, all processability, solvent resistance, and the like, as well as adhesion need to be satisfied. Thus, there is a limitation to replacement of an existing printed steel sheet.

DISCLOSURE

Technical Problem

An aspect of the present disclosure is to provide an ink composition for a steel material, having excellent adhesion to a steel material. Also, another aspect of the present disclosure is to provide an ink composition fora steel material, having excellent jetting properties in a head, workability, processability, and solvent resistance.

Another aspect of the present disclosure is to provide a method for manufacturing a printed steel sheet having excellent adhesion of a coating film to a steel sheet, processability and solvent resistance by applying an ink composition to the steel sheet using an ink-jet method.

Another aspect of the present disclosure is to provide a printed steel sheet with a coating film formed from an ink composition having excellent adhesion to a steel material, processability and solvent resistance.

Technical Solution

According to an aspect of the present disclosure, an ink composition for a steel material includes 10 parts by weight to 30 parts by weight of a mixture of a urethane acrylate oligomer and another type of acrylate oligomer different from the urethane acrylate oligomer, 65 parts by weight to 80 parts by weight of a radiation curable monomer that is a mixture of a monofunctional radiation curable monomer and a di- or more functional radiation curable monomer;

1 part by weight to 10 parts by weight of a photoinitiator; and 0.01 part by weight to 10 parts by weight of an adhesion promoter, the urethane acrylate oligomer and the other type of acrylate oligomer different from the urethane acrylate oligomer are mixed in a weight ratio of 2:1 to 10:1, and the monofunctional radiation curable monomer and the di- or more functional radiation curable monomer are mixed in a weight ratio of 6:1 to 50:1.

As the urethane acrylate oligomer, a urethane acrylate oligomer having a weight-average molecular weight of 500 to 12,000 may be used.

The urethane acrylate oligomer may be aliphatic urethane acrylate, and a number of functional groups in the urethane acrylate oligomer may be less than or equal to 3.

Preferably, the other type of acrylate oligomer may be selected from the group consisting of a polyester acrylate oligomer and an epoxy acrylate oligomer.

A number of functional groups in the polyester acrylate oligomer may be less than or equal to 4.

The polyester acrylate oligomer may have a weight-average molecular weight of 500 to 3,000.

A number of functional groups in the epoxy acrylate oligomer may be less than or equal to 2.

The epoxy acrylate oligomer may preferably have a weight-average molecular weight of 500 to 2,000.

Preferably, as the monofunctional radiation curable monomer, at least one selected from the group consisting of isooctyl acrylate, cyclic trimethylolpropane formal acrylate, phenoxybenzyl acrylate, trimethylcyclohexyl acrylate, isobornyl acrylate, benzyl acrylate, lauryl acrylate, isodecyl acrylate, phenoxyethyl acrylate, tetrahydrofurfurylacrylate, ethoxy ethoxyethyl acrylate, stearyl acrylate, hydroxyethyl acrylate, hydroxypropyl acrylate, acrylic morpholine, vinyl ether, vinyl ester, N-vinyl-2-pyrrolidone, and N-vinylcaprolactam may be used.

Preferably, as the di- or more functional radiation curable monomer, at least one selected from the group consisting of ethylene glycol diacrylate, hexanediol diacrylate, triethylene glycol diacrylate, tripropylene glycol diacrylate, dipropylene glycol diacrylate, tetraethylene glycol diacrylate, neopentyl glycol diacrylate, tricyclodecane dimethanol diacrylate, polyethylene glycol 400 diacrylate, trimethylolpropane triacrylate, ethoxylated trimethylolpropane triacrylate, glycerol triacrylate pentaerythritol, and triacrylate may be used.

Preferably, the ink composition for the steel material may have viscosity of 40 cps or less at room temperature.

The ink composition for the steel material may have a surface tension of 20 to 50 dyne/cm.

According to another aspect of the present disclosure, a method for manufacturing a printed steel sheet includes jetting an ink composition for a steel sheet according to the present disclosure onto a steel sheet; and forming a coating film by curing the jetted ink composition.

According to another aspect of the present disclosure, a printed steel sheet includes a steel sheet; and a coating film formed on the steel sheet from the ink composition for the steel sheet according to the present disclosure.

Advantageous Effects

As set forth above, according to an exemplary embodiment in the present disclosure, an ink composition for a steel material has excellent adhesion of a coating film formed from the ink composition to a steel. In addition, the coating film has excellent processability, solvent resistance and hardness, and a printed steel sheet on which the coating film is formed is used as a high-quality printed steel sheet. Also, the ink composition for the steel material may be applied to a steel material using an ink-jet due to a sufficiently low viscosity thereof at room temperature. The ink composition for the steel material may be a clear ink composition and may be used to form a coating film, and thus it is possible to obtain a printed steel sheet of which texture of a steel material, for example, a steel sheet, is well expressed.

MODE FOR INVENTION

Hereinafter, exemplary embodiments of the present disclosure will be described. However, exemplary embodiments of the present disclosure may be modified to have several other forms, and the scope of the present disclosure is not limited to exemplary embodiments to be described below.

According to an exemplary embodiment of the present disclosure, there is provided an ink composition for a steel material (hereinafter, referred to as an "ink composition according to an exemplary embodiment" for convenience) including 10 parts by weight to 30 parts by weight of a mixture of a urethane acrylate oligomer and another type of acrylate oligomer different from the urethane acrylate oligomer; 65 parts by weight to 80 parts by weight of a radiation curable monomer that is a mixture of a monofunctional radiation curable monomer and a di- or more functional radiation curable monomer; 1 part by weight to 10 parts by weight of a photoinitiator; and 0.01 part by weight to 10 parts by weight of an adhesion promoter, the urethane acrylate oligomer and the other type of acrylate oligomer different from the urethane acrylate oligomer are mixed in a weight ratio of 2:1 to 10:1, and the monofunctional radiation curable monomer and the di- or more functional radiation curable monomer are mixed in a weight ratio of 6:1 to 50:1.

An ink composition for a steel material according to the present disclosure includes a urethane acrylate oligomer as a main material. Generally, in an ultraviolet (UV) curable resin composition, a polyester acrylate oligomer, an epoxy acrylate oligomer, and a urethane acrylate oligomer may be used. However, the polyester acrylate oligomer has poor processability despite good solvent resistance and scratch resistance, and the epoxy acrylate oligomer has a problem in that yellowing occurs despite excellent hardness and solvent resistance. The urethane acrylate oligomer satisfies most of physical properties required by a coating film of a printed steel sheet such as processability, solvent resistance, hardness, adhesion, and the like, and in particular, has a superior effect in processability. Thus, the urethane acrylate oligomer is used as a main material.

It is preferable that the urethane acrylate oligomer is an aliphatic urethane acrylate oligomer that does not include a benzene ring in terms of adhesion, curability, hardness, and the like.

The urethane acrylate oligomer may have 3 or less functional groups, and preferably 1 to 3 functional groups. When the number of functional groups in the urethane acrylate oligomer is greater than 3, processability may decrease due to insufficient flexibility of the coating film. The urethane acrylate oligomer may need to have at least one functional group to form a coating film by a curing reaction.

It is preferable that the urethane acrylate oligomer has a weight-average molecular weight (Mw) of 500 to 12,000. When the weight-average molecular weight is less than 500, processability may decrease due to an increase in a crosslinking density, and when the weight-average molecular weight is greater than 12,000, implementation of viscosity that enables an ink composition to be jetted is generally restricted due to an increase in viscosity of a material, and a crosslinking density of the coating film may be reduced to weaken the solvent resistance.

Non-limiting examples of the urethane oligomer may include Miramer PU210, Miramer PU2034C, Miramer PU2100, Miramer PU2200, Miramer PU330, Miramer PU340, Miramer PU3200, and Miramer PU2560 of Miwon Commercial Co., Ltd., EBECRYL 244, EBECRYL 245, EBECRYL 254, EBECRYL 264, EBECRYL 265, EBECRYL 270, EBECRYL 280, EBECRYL 284, EBECRYL 285, EBECRYL 294, EBECRYL 1259, EBECRYL 1290, EBECRYL 4830, EBECRYL 4835, EBECRYL 4883, EBECRYL 8296, EBECRYL 8402, EBECRYL 8465, EBECRYL 8800, EBECRYL 8803, EBECRYL 8804 EBECRYL 8805, EBECRYL 8806, EBECRYL 9215, EBECRYL 9216, EBECRYL 9259, EBECRYL 9260, EBECRYL 9270, EBECRYL 9370, UA 7933, UP 112, UP 136, and UP 137 of Cytec Industries Inc., and the like. At least one of the above urethane acrylate oligomers may be selected and used, if necessary. The above urethane acrylate oligomers may be used alone or as a combination of two or more thereof, if necessary.

The urethane acrylate oligomer is used together with another type of acrylate oligomer except the urethane acrylate oligomer. By using the urethane acrylate oligomer and the other type of acrylate oligomer together, physical properties such as adhesion, hardness, solvent resistance, processability, viscosity, and the like may be suitably controlled.

In the ink composition of the present disclosure, the mixture of the urethane acrylate oligomer and the other type of acrylate oligomer may be included in an amount of 10 to 30 parts by weight with respect to an amount of the other components of the ink composition according to an exemplary embodiment based on a weight. When the amount of the mixture is less than 10 parts by weight, adhesive properties, processability, solvent resistance, and the like, may be weakened. When the amount of the mixture is greater than 30 parts by weight, it may be difficult to perform jetting because viscosity greatly increases, and accordingly, it may be impossible to use the ink composition in an inkjet system.

The other type of acrylate oligomer may be selected from the group consisting of a polyester acrylate oligomer and an epoxy acrylate oligomer, and may be used. The above acrylate oligomers may be used alone or as a combination of two or more thereof.

The polyester acrylate oligomer may have 4 or less functional groups, and preferably 1 or more and 4 or less functional groups. When the number of functional groups in the polyester acrylate oligomer is greater than 4, processability may decrease due to an increase in crosslinking density. The polyester acrylate oligomer may need to have at least one functional group to form a coating film by a crosslinking reaction.

It is preferable that the polyester acrylate oligomer has a weight-average molecular weight (Mw) of 500 to 3,000. When the weight-average molecular weight is less than 500 or is greater than 3,000, it may be difficult to effectively control physical properties.

Non-limiting examples of the polyester acrylate oligomer may include Miramer PS4040 and Miramer PS420 of Miwon Commercial Co., Ltd., EBECRYL 80, EBECRYL 81, EBECRYL 84, EBECRYL 452, EBECRYL 657, EBECRYL 800, EBECRYL 810, EBECRYL 851, EBECRYL 852, EBECRYL 884, EBECRYL 1657, EBECRYL 1810, and UP 039 of Cytec Industries Inc., and the like. The above polyester acrylate oligomers may be used alone or as a combination of two or more thereof, if necessary.

The epoxy acrylate oligomer may have 2 or less functional groups, and preferably 1 or more and 2 or less functional groups. When the number of functional groups in the epoxy acrylate oligomer is greater than 2, processability may decrease. The epoxy acrylate oligomer may need to have at least one functional group to form a coating film by a crosslinking reaction.

It is preferable that the epoxy acrylate oligomer has a weight-average molecular weight of 500 to 2,000. When the weight-average molecular weight is less than 500 or is greater than 2,000, it may be difficult to satisfy required physical properties.

Non-limiting examples of the epoxy acrylate oligomer may include Miramer EA2235, Miramer EA2255, Miramer EA2259 and Miramer EA2280 of Miwon Commercial Co., Ltd., EBECRYL 600, EBECRYL 604, EBECRYL 605, EBECRYL 606, EBECRYL 608, EBECRYL 629, EBECRYL 645, EBECRYL 648, EBECRYL 1608, EBECRYL 1940, EBECRYL 2959, EBECRYL 3105, EBECRYL 3200, EBECRYL 3201, EBECRYL 3500, EBECRYL 3502, EBECRYL 3600, EBECRYL 3605, EBECRYL 3700, EBECRYL 3701, EBECRYL 3702, EBECRYL 3703, EBECRYL 3708, EBECRYL 3720, EBECRYL 6040, EBECRYL 9686, EBECRYL 9706, and EBECRYL 9704 of Cytec Industries Inc., and the like, however, there is no particular limitation to types such as a bisphenol A type, a bisphenol F type, a novolac type, and the like. The above epoxy acrylate oligomer may be used alone or as a combination of two or more thereof, if necessary.

It is preferable that the urethane acrylate oligomer and the other type of acrylate oligomer are mixed and used in a weight ratio of 2:1 to 10:1, and preferably a weight ratio of 2:1 to 7:1. It is preferable to mix and use the urethane acrylate oligomer and the other type of acrylate oligomer in the above mixing ratio range in view of balanced physical properties.

The ink composition of the present disclosure includes a radiation curable monomer as a diluent of the mixture of the urethane acrylate oligomer and the other type of acrylate oligomer. As the radiation curable monomer, a mixture of a monofunctional radiation curable monomer and a di- or more functional radiation curable monomer is used.

In the ink composition of the present disclosure, the radiation curable monomer may be included in an amount of 65 parts by weight to 80 parts by weight with respect to the amount of the other components of the ink composition according to an exemplary embodiment based on a weight of the ink composition. When the amount of the radiation curable monomer is less than 65 parts by weight, viscosity may increase, and accordingly it may be impossible to apply the ink composition to a steel material using an inkjet system. On the contrary, when the amount of the radiation curable monomer is greater than 80 parts by weight, overall coating film physical properties may be adversely affected.

The monofunctional radiation curable monomer allows the ink composition of the present disclosure to have low viscosity, and enhances adhesion and processability of a coating film formed from the ink composition of the present disclosure. Non-limiting examples of the monofunctional radiation curable monomer may include isooctyl acrylate, cyclic trimethylolpropane formal acrylate, phenoxybenzyl acrylate, trimethylcyclohexyl acrylate, isobornyl acrylate, benzyl acrylate, lauryl acrylate, isodecyl acrylate, phenoxyethyl acrylate, tetrahydrofurfuryl acrylate, ethoxy ethoxyethyl acrylate, stearyl acrylate, hydroxyethyl acrylate, hydroxypropylacrylate, acrylic morpholine, vinyl ether, vinyl ester, N-vinyl-2-pyrrolidone, N-vinylcaprolactam, and the like. At least one of the above monofunctional radiation curable monomers may be selected and used, if necessary. The above monofunctional radiation curable monomers may be used alone or as a combination of two or more thereof, if necessary.

The di- or more functional radiation curable monomer enhances solvent resistance and surface strength of a coating film formed from the ink composition of the present disclosure. Non-limiting examples of the di- or more functional radiation curable monomer may include ethylene glycol diacrylate, hexanediol diacrylate, triethylene glycol diacrylate, tripropylene glycol diacrylate, dipropylene glycol diacrylate, tetraethylene glycol diacrylate, neopentyl glycol diacrylate, tricyclodecane dimethanol diacrylate, polyethylene glycol 400 diacrylate, trimethylolpropane triacrylate, ethoxylated trimethylolpropane triacrylate, glycerol triacrylate, pentaerythritol triacrylate, and the like. At least one of the above di- or more functional radiation curable monomers may be selected and used, if necessary. The above di- or more functional radiation curable monomers may be used alone or as a combination of two or more thereof, if necessary. The di- or more functional radiation curable monomer may have up to 6 functional groups. This is because the maximum number of functional groups included in the radiation curable monomer is six.

Also, to enhance adhesion, processability, solvent resistance, and surface hardness during forming of a coating film, it is preferable to mix the monofunctional radiation curable monomer and the di- or more functional radiation curable monomer and to use the mixture of the monofunctional radiation curable monomer and the di- or more functional radiation curable monomer as the radiation curable monomer.

It is preferable that when the monofunctional radiation curable monomer and the di- or more functional radiation curable monomer are mixed and used, the monofunctional radiation curable monomer and the di- or more functional radiation curable monomer are mixed in a weight ratio of 6:1 to 50:1 and used. It is preferable to mix the monofunctional radiation curable monomer and the di- or more functional radiation curable monomer in the above ratio, in terms of adjustment of viscosity and effective control of physical properties of an entire coating film.

The ink composition of the present disclosure includes a photoinitiator to induce a polymerization of the urethane acrylate oligomer, the other type of acrylate oligomer and the radiation curable monomer using UV rays. As a photoinitiator, any photoinitiator capable of inducing a photopolymerization of the ink composition according to the present disclosure may be used.

Specific examples of the photoinitiator may include, but are not limited to, the following compounds or combinations thereof: benzophenone and substituted benzophenones, 1-hydroxycyclohexyl phenyl ketone, thioxanthone such as isopropylthioxanthone, 2-hydroxy-2-methyl-1-phenylpropan-1-one, 2-benzyl-2-dimethylamino-(4-morpholinophenyl)butan-1-one, benzyl dimethyl ketal, bis(2,6)-dimethylpenzoyl)-2,4,4-trimethylpentylphosphine oxide, 2,4,6-trimethylbenzoyl diphenylphosphine oxide, ethyl-2,4,6-trimethylbenzoyl phenylphosphinate, 2-methyl-1-[4 (methylthio)phenyl]-2-morpholinopropan-1-one, 2,2-dimethoxy-1,2-diphenylethan-1-one, 5,7-diiodo-3-butoxy-6-fluorone, diphenyliodonium fluoride, sulfonium hexafluorophosphate, and the like.

Also, non-limiting examples of the photoinitiator available in the ink composition of the present disclosure may include Irgacure® 184, 500, 369, 379, 651, 907, 819, Darocur® 1173, MBF, TPO, BP, and the like. At least one of the above photoinitiators may be selected and used, if necessary.

In the ink composition of the present disclosure, the photoinitiator may be included in an amount of 1 part by weight to 10 parts by weight with respect to the amount of the other components of the ink composition according to an exemplary embodiment based on a weight of a clear ink composition. When the amount of the photoinitiator is less than 1 part by weight, a print layer may not sufficiently cured and performance of the print layer may not properly implemented. On the contrary, when the amount of the photoinitiator is greater than 10 parts by weight, yellowing may occur in the print layer, or storage stability of a composition may decrease.

The ink composition of the present disclosure includes an adhesion promoter to increase adhesion to a material. Non-limiting examples of the adhesion promoter available in the ink composition of the present disclosure may include an acidic group-containing adhesion promoter, a polymer-type adhesion promoter, a coupling agent, and the like.

Non-limiting examples of the acidic group-containing adhesion promoter may include a phosphoric acid-based adhesion promoter with a structure of a phosphoric acid in a structure, and a carboxylic acid-based adhesion promoter with a structure of a carboxylic acid.

Non-limiting examples of an acidic group-containing adhesion promoter available in the ink composition of the present disclosure may include EBECRYL168, EBECRYL170, EBECRYL171, EBECRYL9050, and HS100 of Cytec Industries Inc., BYK-4510 and BYK-4512 of BYK Chemie Company, SZ-9166, SZ-9167, SP220, SP224, SP236, SP236L, SP238, SP270, SP271, and SP277 of Soltech Ltd., MIRAMER PS2500 and MIRAMER PS4800 of Miwon Commercial Co., Ltd., GENORAD40 of Rahn, KAYAMER PM-2 and KAYAMER PM-21 of Nippon Kayaku Co., Ltd., QUALICURE™ GU2168Z and GA2600Y of Qualipoly Chemical Corp., and the like. The above acidic group-containing adhesion promoters may be used alone or as a combination of two or more thereof, if necessary.

As the polymer-type adhesion promoter, a generally known polymer-type adhesion promoter may be used, and is not limited to types thereof, however, examples thereof may include an amine-based liquid polymer, polyamine, a petroleum resin, polybutene, an acrylic modified resin, an acryloyl morpholine resin, and the like. The above polymer-type adhesion promoters may be used alone or as a combination of two or more thereof, if necessary.

Non-limiting examples of a polymer-type adhesion promoter available in the ink composition of the present disclosure may include AA857 of Aekyung Chemical Co. Ltd., PAP700 of FTA KOREA, and the like, which may be used alone or as a combination of two or more thereof, if necessary.

Non-limiting examples of the coupling agent may include vinyl silanes such as vinyl tris(β-methoxyethoxy)silane, vinyl ethoxysilane, vinyl trimethoxysilane, and the like, (meth)acrylsilanes such as γ-methacryloxypropyl trimethoxysilane, and the like, epoxysilanes such as β-(3,4-epoxycyclohexyl)ethyltrimethoxysilane, β-(3,4-epoxycyclohexyl) methyltrimethoxysilane, β-(3,4-epoxycyclohexyl) ethyltriethoxysilane, β-(3,4-epoxycyclohexyl) methyltriethoxysilane, γ-glycidoxypropyltrimethoxysilane, γ-glycidoxypropyltriethoxysilane, and the like, aminosilanes such as N-β(aminoethyl) γ-aminopropyltrimethoxysilane, N-β(aminoethyl) γ-aminopropyltriethoxysilane, N-β(aminoethyl) γ-aminopropylmethyldiethoxysilane, γ-aminopropyltriethoxysilane, γ-aminopropyltrimethoxysilane, N-phenyl-γ-aminopropyltrimethoxysilane, N-phenyl-γ-aminopropyltriethoxysilane, and the like, thiosilanes such as γ-mercaptopropyltrimethoxysilane, γ-mercaptopropyltriethoxysilane, and the like. The above coupling agents may be used alone or as a combination of two or more thereof, if necessary.

Non-limiting examples of a coupling agent available in the present disclosure may include a Z silane coupling agent and an XIAMETER® (OFS) silane coupling agent that are commercially sold in the market and available from Dow Corning Corporation, and KBM and KBE silane coupling agents available from Shin-Etsu chemical Co., Ltd., which may be selected and used. Also, the above coupling agents may be used alone or as a combination of two or more thereof, if necessary.

In the ink composition of the present disclosure, the adhesion promoter may be included in an amount of 0.01 part by weight to 10 parts by weight, and more preferably 0.1 part by weight to 5 parts by weight, with respect to the amount of the other components of the ink composition according to an exemplary embodiment based on the weight of the ink composition. When the amount of the adhesion promoter is less than 0.01 part by weight, adhesion properties may not be properly implemented. When the amount of the adhesion promoter is greater than 10 parts by weight, a problem of failing to cure a surface due to a deterioration in curing properties by UV irradiation, or of a decrease in storage stability of the ink composition may occur.

In the ink composition of the present disclosure, a leveling agent, an antifoaming agent, an antioxidant, a light stabilizer, a UV ray absorbent, and the like, may be included in amounts within a range that does not deteriorate required physical properties, if necessary.

The ink composition of the present disclosure has low viscosity in comparison to a composition of an existing silk screen or roll printing method, to form a coating film through an inkjet system. Specifically, the ink composition of the present disclosure has viscosity of 40 cps or less at room temperature (for example, a temperature of 15° C. to 25° C.), preferably 30 cps or less, and more preferably viscosity of 20 cps to 30 cps. A color ink composition in the above viscosity range may be suitably applied to form a coating film on a steel material using the inkjet system. In other words, the ink composition of the present disclosure may have viscosity applicable to a target material by the inkjet system, and accordingly may be applied to a steel material using the inkjet system. The ink composition of the present disclosure has an advantage that a level of viscosity available in the inkjet system is secured even though an organic solvent is not used as described above.

As described above, the ink composition of the present disclosure has sufficiently low viscosity so that a coating film is formed on a material using the inkjet system before curing, and a coating film formed on a steel material by curing has a satisfactory level of adhesion to the steel material, processability, solvent resistance, and hardness.

Also, the ink composition desirably has an appropriate surface tension for application to a steel material by jetting in the inkjet system. The ink composition of the present disclosure has a surface tension of 20 to 50 dyne/cm at room temperature (for example, a temperature of 15° C. to 25° C.), preferably a surface tension of 22 to 40 dyne/cm. When the surface tension is less than 20 dyne/cm, a phenomenon in which jetting is obstructed due to blockage of nozzles caused by gathering of ink in a head nozzle portion of the inkjet system may occur, or a nozzle dropout phenomenon may occur, and an ink leakage phenomenon may occur in a nozzle portion. When the surface tension is greater than 50 dyne/cm, it may be difficult to continue to perform jetting because ink is not smoothly supplied to an inkjet printer head, or leveling properties on a material surface when ink is jetted onto a steel material may decrease, and accordingly it may be difficult to implement a preferable coating film and difficult to satisfy required physical properties.

The steel material may include, but is not particularly limited to, for example, a steel sheet. As the steel sheet, both a steel sheet with a surface on which pretreatment coating is not separately performed, and a coated steel sheet with a surface on which pretreatment coating is separately performed may be used. Although types of steel sheets to which the ink composition of the present disclosure is applicable are not particularly limited, non-limiting examples thereof may include a cold-rolled steel sheet, a hot-rolled steel sheet, a zinc-plated steel sheet, an aluminum-plated steel sheet, a stainless steel sheet, a magnesium steel sheet, an aluminum steel sheet, a zinc steel sheet, a titanium steel sheet, a color-coated steel sheet, an anti-fingerprint steel sheet, and the like. Also, the steel sheet may be subjected to a plasma treatment, if necessary. The ink composition of the present disclosure is applied onto a surface of a steel sheet, and a thickness of the steel sheet to which the ink composition is applied is not particularly limited. Generally, a steel sheet with a thickness of 0.1 mm to 10 mm may be used.

According to another exemplary embodiment of the present disclosure, a method for manufacturing a printed steel sheet which includes jetting an ink composition for a steel sheet according to the present disclosure onto a steel sheet; and forming a coating film by curing the jetted ink composition is provided. The above description of the ink composition is equally applicable to the method for manufacturing a printed steel sheet.

A coating film formed from the ink composition of the present disclosure may have excellent adhesion to a steel material and low viscosity at room temperature, as described above, and accordingly the coating film may be applied by jetting the ink composition onto a steel sheet using an inkjet system.

The ink composition of the present disclosure may be jetted onto the steel material, for example, a steel sheet, using the inkjet system, and applied. Print heads widely used for inkjet printing systems may be broadly classified into a thermal inkjet print head that jets ink by forming air bubbles through instantaneous heat generation on a heating plate in a head, and a piezoelectric head that is filled with ink by changing a piezoelectric ceramic transducer in a print head by applying voltage, and that jets ink, and may also include various types of print heads, for example, a continuous print head, an electrostatic print head, and the like. Although a piezoelectric head is used as a head for an inkjet printing system in the present disclosure, there is no particular limitation thereto and various types of heads may be used.

An inkjet print head performs jetting typically at a temperature of 65° C. or less, preferably a temperature of 50° C. or less, and more particularly a temperature of 50° C. to room temperature (for example, a temperature of 15° C. to 25° C.), due to potential volatility and reactivity of one or more components of the ink composition, head durability, and the like. To implement a correct image, it may be advantageous to have a movement speed of a jetted droplet of 4 m/s to 15 m/s, and to form a distance between a steel material and a head ranging from 1 mm to 10 mm, and preferably from 1 mm to 7 mm.

A thickness of a coating film formed through jetted droplets may vary depending on a resolution of an image to be implemented or the number of print layers, however, it may be advantageous to form a thickness of 5 μm to 50 μm, and preferably a thickness of 5 μm to 30 μm, to secure physical properties of the coating film.

Thereafter, UV rays are irradiated onto the jetted ink composition and the ink composition is cured, to form a coating film. Curing means may be arranged in combination with a print head of an inkjet printer and may move together with the print head, to irradiate UV rays, or UV rays may be irradiated through a static fixed curing means. One of the above curing means may be used, or two or more types thereof may be used together.

UV rays irradiated using the curing means may be generally classified into a UV-A region of 400 nm to 320 nm, a UV-B region of 320 nm to 290 nm, and a UV-C region of 290 nm to 100 nm, based on wavelengths. In a mercury lamp, a metal-halide lamp, and a gallium lamp, UV rays may be irradiated at a multi-wavelength in the entire UV region. In a light-emitting diode (LED) lamp, UV rays of a specific wavelength band may be irradiated based on a configuration of an LED module.

UV curing lamps may be divided into a mercury lamp, a metal-halide lamp, a gallium lamp, and the like, based on types of luminous materials in a lamp, and may be classified into an H-bulb, a D-bulb, an A-bulb, and the like, based on irradiated wavelengths.

In the ink composition according to the present disclosure, an H-Bulb UV lamp of Integration Technology is used as a curing means, but the present disclosure is not particularly limited thereto, and any type of lamps may be used.

The ink composition of the present disclosure may be jetted onto a steel material from an inkjet printer head, then cured by a UV curing means, and formed as a coating film. An amount of curing energy may be determined based on a large number of factors, such as a type and an amount of related reactants, an energy source, a distance from an energy source, a thickness of a coating film to be cured, and the like, an amount of UV radiation may typically range from about 0.1 $J/cm^2$ to 10 $J/cm^2$, a UV exposure time may be less than about 1 second and less than or equal to 10 minutes. Also, radiation of UV rays may occur in air or in an inert environment such as nitrogen. By performing curing based on the amount of UV radiation and the UV exposure time, a coating film with desired physical properties may be formed.

According to another exemplary embodiment of the present disclosure, there is provided a printed steel sheet including a steel sheet; and a coating film formed from the ink composition of the present disclosure on the steel sheet. The above description of the ink composition and the method for manufacturing the printed steel sheet is equally applicable to the printed steel sheet of the present disclosure.

The coating film formed from the ink composition of the present disclosure as described above is excellent in terms of adhesion to the steel sheet, and is also excellent in terms of solvent resistance, processability, hardness, and the like, of the coating film. Thus, the printed steel sheet of the present disclosure including the coating film also has a high quality, to satisfy physical properties required by a printed steel sheet.

Hereinafter, the present disclosure will be described in more detail with respect to the following examples. The following examples are merely examples to help in understanding the present disclosure, not to limit the scope of the present disclosure.

1. Preparation of Ink Composition

Example 1

An ink composition was prepared by mixing 10 parts by weight of a urethane acrylate oligomer (EBECRYL 8465, Cytec Industries Inc., 3 functional groups, Mw 1,400), 5 parts by weight of a polyester acrylate oligomer (Miramer PS420, Miwon Commercial Co., Ltd., 4 functional groups, Mw 1,800), 30 parts by weight of phenoxyethyl acrylate (2-PEA), 20 parts by weight of tetrahydrofurfuryl acrylate (THFA), 17.5 parts by weight of isobornyl acrylate (IBOA), 10 parts by weight of hexanediol diacrylate (HDDA), 6 parts by weight of photoinitiator Darocur 1173 (BASF), 0.5 parts by weight of a leveling agent (BYK-UV3510, BYK Chemie Company), and 1 part by weight of an adhesion promoter (HS100, Cytec Industries Inc.). The composition of used components is shown in Table 1 below.

Example 2

An ink composition was prepared by mixing 10 parts by weight of a urethane acrylate oligomer (EBECRYL 8465, Cytec Industries Inc., 3 functional groups, Mw 1,400), 5 parts by weight of epoxy acrylate oligomer (EBECRYL 3200, Cytec Industries Inc., 2 functional groups, Mw 500), 30 parts by weight of phenoxyethyl acrylate (2-PEA), 20 parts by weight of tetrahydrofurfuryl acrylate (THFA), 17.5 parts by weight of isobornyl acrylate (IBOA), 10 parts by weight of hexanediol diacrylate (HDDA), 6 parts by weight of photoinitiator Darocur 1173 (BASF), 0.5 parts by weight of a leveling agent (BYK-UV3510, BYK Chemie Company), and 1 part by weight of an adhesion promoter (HS100, Cytec Industries Inc.). The composition of used components is shown in Table 1 below.

Example 3

An ink composition was prepared by mixing 10 parts by weight of a urethane acrylate oligomer (EBECRYL 8465, Cytec Industries Inc., 3 functional groups, Mw 1,400), 5 parts by weight of a polyester acrylate oligomer (Miramer PS420, Miwon Commercial Co., Ltd., 4 functional groups, Mw 1,800), 20 parts by weight of tetrahydrofurfuryl acrylate (THFA), 17.5 parts by weight of isobornyl acrylate (IBOA), 30 parts by weight of hydroxypropylacrylate (2-HPA), 10 parts by weight of hexanediol diacrylate (HDDA), 6 parts by weight of photoinitiator Darocur 1173 (BASF), 0.5 parts by weight of a leveling agent (BYK-UV3510, BYKChemie Company), and 1 part by weight of an adhesion promoter (HS100, Cytec Industries Inc.). The composition of used components is shown in Table 1 below.

Example 4

An ink composition was prepared by mixing 10 parts by weight of a urethane acrylate oligomer (EBECRYL 8465, Cytec Industries Inc., 3 functional groups, Mw 1,400), 5 parts by weight of a polyester acrylate oligomer (Miramer PS420, Miwon Commercial Co., Ltd., 4 functional groups, Mw 1,800), 30 parts by weight of phenoxyethyl acrylate (2-PEA), 20 parts by weight of tetrahydrofurfuryl acrylate (THFA), 17.5 parts by weight of isobornyl acrylate (IBOA), 10 parts by weight of dipropylene glycol diacrylate (DPGDA), 6 parts by weight of photoinitiator Darocur 1173 (BASF), 0.5 parts by weight of a leveling agent (BYK-UV3510, BYK Chemie Company), and 1 part by weight of an adhesion promoter (HS100, Cytec Industries Inc.). The composition of used components is shown in Table 1 below.

Comparative Example 1

An ink composition was prepared by mixing 15 parts by weight of a polyester acrylate oligomer (Miramer PS420, Miwon Commercial Co., Ltd., 4 functional groups, Mw 1,800), 30 parts by weight of phenoxyethyl acrylate (2-PEA), 20 parts by weight of tetrahydrofurfuryl acrylate (THFA), 15 parts by weight of isobornyl acrylate (IBOA), 12.5 parts by weight of hexanediol diacrylate (HDDA), 6 parts by weight of photoinitiator Darocur 1173 (BASF), 0.5 parts by weight of a leveling agent (BYK-UV3510, BYK Chemie Company), and 1 part by weight of an adhesion promoter (HS100, Cytec Industries Inc.). The composition of used components is shown in Table 1 below.

Comparative Example 2

An ink composition was prepared by mixing 15 parts by weight of an epoxy acrylate oligomer (EBECRYL 3200, Cytec Industries Inc., 2 functional groups, Mw 500), 30 parts by weight of phenoxyethyl acrylate (2-PEA), 20 parts by weight of tetrahydrofurfuryl acrylate (THFA), 15 parts by weight of isobornyl acrylate (IBOA), 12.5 parts by weight of hexanediol diacrylate (HDDA), 6 parts by weight of photoinitiator Darocur 1173 (BASF), 0.5 parts by weight of a leveling agent (BYK-UV3510, BYK Chemie Company), and 1 part by weight of an adhesion promoter (HS100, Cytec Industries Inc.). The composition of used components is shown in Table 1 below.

Comparative Example 3

An ink composition was prepared by mixing 25 parts by weight of a urethane acrylate oligomer (EBECRYL 8465, Cytec Industries Inc., 3 functional groups, Mw 1,400), 10 parts by weight of a polyester acrylate oligomer (Miramer PS420, Miwon Commercial Co., Ltd., 4 functional groups, Mw 1,800), 10 parts by weight of phenoxyethyl acrylate (2-PEA), 20 parts by weight of tetrahydrofurfuryl acrylate (THFA), 15 parts by weight of isobornyl acrylate (IBOA), 12.5 parts by weight of hexanediol diacrylate (HDDA), 6 parts by weight of photoinitiator Darocur 1173 (BASF), 0.5 parts by weight of a leveling agent (BYK-UV3510, BYK Chemie Company), and 1 part by weight of an adhesion promoter (HS100, Cytec Industries Inc.). The composition of used components is shown in Table 1 below.

Comparative Example 4

An ink composition was prepared by mixing 5 parts by weight of a urethane acrylate oligomer (EBECRYL 8465, Cytec Industries Inc., 3 functional groups, Mw 1,400), 3 parts by weight of a polyester acrylate oligomer (Miramer PS420, Miwon Commercial Co., Ltd., 4 functional groups, Mw 1,800), 37 parts by weight of phenoxyethyl acrylate (2-PEA), 20 parts by weight of tetrahydrofurfuryl acrylate (THFA), 15 parts by weight of isobornyl acrylate (IBOA), 12.5 parts by weight of hexanediol diacrylate (HDDA), 6 parts by weight of photoinitiator Darocur 1173 (BASF), 0.5 parts by weight of a leveling agent (BYK-UV3510, BYK Chemie Company), and 1 part by weight of an adhesion promoter (HS100, Cytec Industries Inc.). The composition of used components is shown in Table 1 below.

Comparative Example 5

An ink composition was prepared by mixing 10 parts by weight of a urethane acrylate oligomer (EBECRYL 8465, Cytec Industries Inc., 3 functional groups, Mw 1,400), 5 parts by weight of a polyester acrylate oligomer (Miramer PS420, Miwon Commercial Co., Ltd., 4 functional groups, Mw 1,800), 42.5 parts by weight of phenoxyethyl acrylate (2-PEA), 20 parts by weight of tetrahydrofurfuryl acrylate (THFA), 15 parts by weight of isobornyl acrylate (IBOA), 6 parts by weight of photoinitiator Darocur 1173 (BASF), 0.5 parts by weight of a leveling agent (BYK-UV3510, BYK Chemie Company), and 1 part by weight of an adhesion promoter (HS100, Cytec Industries Inc.). The composition of used components is shown in Table 1 below.

Comparative Example 6

An ink composition was prepared by mixing 10 parts by weight of a urethane acrylate oligomer (EBECRYL 8465, Cytec Industries Inc., 3 functional groups, Mw 1,400), 5 parts by weight of a polyester acrylate oligomer (Miramer PS420, Miwon Commercial Co., Ltd., 4 functional groups, Mw 1,800), 10 parts by weight of phenoxyethyl acrylate (2-PEA), 10 parts by weight of tetrahydrofurfuryl acrylate (THFA), 7.5 parts by weight of isobornyl acrylate (IBOA), 50 parts by weight of hexanediol diacrylate (HDDA), 6 parts by weight of photoinitiator Darocur 1173 (BASF), 0.5 parts by weight of a leveling agent (BYK-UV3510, BYK Chemie Company), and 1 part by weight of an adhesion promoter (HS100, Cytec Industries Inc.). The composition of used components is shown in Table 1 below.

Comparative Example 7

An ink composition was prepared by mixing 5 parts by weight of a urethane acrylate oligomer (EBECRYL 8465, Cytec Industries Inc., 3 functional groups, Mw 1,400), 10 parts by weight of a polyester acrylate oligomer (Miramer PS420, Miwon Commercial Co., Ltd., 4 functional groups, Mw 1,800), 30 parts by weight of phenoxyethyl acrylate (2-PEA), 20 parts by weight of tetrahydrofurfuryl acrylate (THFA), 15 parts by weight of isobornyl acrylate (IBOA), 12.5 parts by weight of hexanediol diacrylate (HDDA), 6 parts by weight of photoinitiator Darocur 1173 (BASF), 0.5 parts by weight of a leveling agent (BYK-UV3510, BYK Chemie Company), and 1 part by weight of an adhesion promoter (HS100, Cytec Industries Inc.). The composition of used components is shown in Table 1 below.

Comparative Example 8

An ink composition was prepared by mixing 14 parts by weight of a urethane acrylate oligomer (EBECRYL 8465, Cytec Industries Inc., 3 functional groups, Mw 1,400), 1 part by weight of a polyester acrylate oligomer (Miramer PS420, Miwon Commercial Co., Ltd., 4 functional groups, Mw 1,800), 31 part by weight of phenoxyethyl acrylate (2-PEA), 20 parts by weight of tetrahydrofurfuryl acrylate (THFA), 15 parts by weight of isobornyl acrylate (IBOA), 12.5 parts by weight of hexanediol diacrylate (HDDA), 6 parts by weight of photoinitiator Darocur 1173 (BASF), and 0.5 parts by weight of a leveling agent (BYK-UV3510, BYK Chemie Company). The composition of used components is shown in Table 1 below.

TABLE 1

Composition of Examples 1 to 4 and Comparative Examples 1 to 8
(Composition unit: Parts by weight)

| Classification | Examples | | | | Comparative Examples | | | | | | | |
|---|---|---|---|---|---|---|---|---|---|---|---|---|
| | 1 | 2 | 3 | 4 | 1 | 2 | 3 | 4 | 5 | 6 | 7 | 8 |
| EBECRYL 8465 | 10 | 10 | 10 | 10 | | | 25 | 5 | 10 | 10 | 5 | 14 |
| Miramer PS420 | 5 | | 5 | 5 | 15 | | 10 | 3 | 5 | 5 | 10 | 1 |
| EBECRYL 3200 | | 5 | | | | 15 | | | | | | |
| 2-PEA | 30 | 30 | | 30 | 30 | 30 | 10 | 37 | 42.5 | 10 | 30 | 31 |
| THFA | 20 | 20 | 20 | 20 | 20 | 20 | 20 | 20 | 20 | 10 | 20 | 20 |
| IBOA | 17.5 | 17.5 | 17.5 | 17.5 | 15 | 15 | 15 | 15 | 15 | 7.5 | 15 | 15 |
| 2-HPA | | | 30 | | | | | | | | | |
| HDDA | 10 | 10 | 10 | | 12.5 | 12.5 | 12.5 | 12.5 | | 50 | 12.5 | 12.5 |
| DPGDA | | | | 10 | | | | | | | | |
| Darocur 1173 | 6 | 6 | 6 | 6 | 6 | 6 | 6 | 6 | 6 | 6 | 6 | 6 |
| BYK-UV3510 | 0.5 | 0.5 | 0.5 | 0.5 | 0.5 | 0.5 | 0.5 | 0.5 | 0.5 | 0.5 | 0.5 | 0.5 |
| HS100 | 1 | 1 | 1 | 1 | 1 | 1 | 1 | 1 | 1 | 1 | 1 | |

(*Color ink compositions of Examples 1 to 4 and Comparative Examples 1 to 8 had a surface tension of 25 to 30 dyne/cm)

2. Preparation of Specimen

The ink compositions of Examples 1 to 4 and Comparative Examples 1 to 8 were jetted onto an SUS steel sheet using an InkTec JETRIX KX6SD UV printer and cured with UV, and a coating film with a thickness of 5 to 10 μm was formed, to prepare a specimen. Specific printing conditions are shown below.

Used equipment: InkTec JETRIX KX6SD
Used head: Konica Minolta KM1024SHB
Head temperature: 45° C.

Image resolution: 1440×720 dpi
Print mode: Fine art (12pass)
UV source: Integration Subzero Lamp 170 mm H-bulb
Curing mode: Normal Full Cure
UV dose: measured by EIT UV Power Puck, Total UV dose of about 2 J/cm$^2$
UV irradiation time: 3 seconds
Coating film thickness: 7 μm
Distance between print head and material: 2 mm
Droplet movement speed: 4 m/sec to 15 m/sec 3. Evaluation Method of Specimen The ink compositions and the specimen prepared as described above were evaluated in terms of viscosity, adhesion (adhesiveness), processability, solvent resistance, and hardness, and the results are shown in Table 2.

(1) Viscosity

Viscosity of an ink composition was measured and evaluated using a BrookField viscometer DV II+CPE-40 spindle at 25° C.

(2) Adhesion (Adhesiveness)

The specimen was cut into 100 pieces by drawing 10 lines using a cutter to have a size of 1 mm×1 mm (width×length), a cellophane adhesive tape was attached thereon, and then taken off to evaluate adhesiveness, that is, adhesion of a coating film.

(⊚: Nothing was observed (not detached), ○: Less than 10 coating films were detached, Δ: Less than 50 coating films were detached, X: All coating films were detached)

(3) Processability

For processability, specimens were subjected to 180° bending of 3T (3 sheets, material thickness) and whether a crack occurred was confirmed.

(⊚: Nothing was observed (no crack occurred), X: Crack occurred)

(4) Solvent Resistance

For solvent resistance, methyl ethyl ketone (MEK) was applied to a gauze and rubbing the gauze back and force with a constant force, to observe a state of a coating film. The number of times a coating film was peeled off or damaged by the solvent was evaluated separately.

(⊚: More than 50 times, ○: Less than 20 times, Δ: Less than 10 times, X: Less than 5 times)

(5) Pencil Hardness

Pencil hardness was measured according to JIS K5600-5-4KS. Here, the pencil hardness was sequentially measured from 9B to 9H. The closer to 9B, the lower the pencil hardness, and the closer to 9H, the higher the pencil hardness.

formed from the ink compositions of Examples 1 to 4 were excellent in adhesion, processability, solvent resistance, and pencil hardness.

Meanwhile, coating films formed from the ink compositions of Comparative Examples 1 and 2 in which the polyester acrylate oligomer or the epoxy acrylate oligomer was used alone as an acrylate oligomer lacked processability. It was confirmed that it was difficult to jet the ink composition of Comparative Example 3, in which a total amount of the urethane acrylate oligomer and another type of acrylate oligomer is greater than 30 parts by weight and an amount of a radiation curable monomer is less than 65 parts by weight, using an inkjet system due to high viscosity thereof. It was observed that a coating film formed from the ink composition of Comparative Example 4 in which a total amount of the urethane acrylate oligomer and another type of acrylate oligomer is less than 10 parts by weight was degraded in performance in terms of overall physical properties. It was confirmed that coating films formed from the ink compositions of Comparative Examples 5 and 6, in which a di- or more functional radiation curable monomer was not contained regardless of a type thereof, or in which a di- or more functional radiation curable monomer was excessively included beyond an appropriate mixing ratio, were reduced in solvent resistance and processability. In addition, it was confirmed based on Comparative Examples 7 and 8 that when a mixing ratio of a urethane acrylate oligomer and another type of acrylate oligomer is inappropriate despite an appropriate total amount of the urethane acrylate oligomer and the other type of acrylate oligomer, it was impossible to implement balanced physical properties. In Comparative Example 8 in which an adhesion promoter was not used, deterioration of adhesion was confirmed.

The invention claimed is:

1. An ink composition for a steel material, comprising:
   10 parts by weight to 30 parts by weight of a mixture of a urethane acrylate oligomer and a polyester acrylate oligomer, wherein the urethane acrylate oligomer and the polyester acrylate oligomer are mixed in a weight ratio of 2:1 to 10:1;
   65 parts by weight to 80 parts by weight of a radiation curable monomer that is a mixture of a monofunctional radiation curable monomer and a di- or more functional radiation curable monomer, wherein the monofunctional radiation curable monomer and the di- or more functional radiation curable monomer are mixed in a weight ratio of 6:1 to 50:1;

TABLE 2

| | Evaluation of Physical properties | | | | | | | | | | | |
|---|---|---|---|---|---|---|---|---|---|---|---|---|
| | Examples | | | | Comparative Examples | | | | | | | |
| Classification | 1 | 2 | 3 | 4 | 1 | 2 | 3 | 4 | 5 | 6 | 7 | 8 |
| Viscosity (cps) | 18.2 | 19.8 | 18.5 | 19.2 | 16.3 | 19.6 | 47.5 | 14.2 | 21.8 | 19.4 | 17.6 | 19.9 |
| Adhesiveness | ⊚ | ⊚ | ⊚ | ⊚ | ⊚ | ⊚ | — | Δ | ⊚ | ⊚ | ⊚ | X |
| Processability | ⊚ | ⊚ | ⊚ | ⊚ | X | X | — | X | ⊚ | X | X | ⊚ |
| Solvent resistance | ⊚ | ⊚ | ⊚ | ⊚ | ⊚ | ○ | — | X | Δ | ⊚ | ⊚ | ○ |
| Pencil hardness | 3H | 3H | 3H | 2H | 3H | 3H | — | HB | H | 3H | 3H | 3H |

As shown in Table 2 above, all the ink compositions of Examples 1 to 4 satisfying a composition of an ink composition of the present disclosure exhibited viscosity that enables jetting without a great difficulty. Also, coating films 1 part by weight to 10 parts by weight of a photoinitiator; and
0.01 part by weight to 10 parts by weight of an adhesion promoter.

2. The ink composition of claim 1, wherein the urethane acrylate oligomer has a weight-average molecular weight of 500 to 12,000.

3. The ink composition of claim 1, wherein the urethane acrylate oligomer is aliphatic urethane acrylate.

4. The ink composition of claim 1, wherein a number of functional groups in the urethane acrylate oligomer is less than or equal to 3.

5. The ink composition of claim 1, wherein a number of functional groups in the polyester acrylate oligomer is less than or equal to 4.

6. The ink composition of claim 1, wherein the polyester acrylate oligomer has a weight-average molecular weight of 500 to 3,000.

7. The ink composition of claim 1, wherein the monofunctional radiation curable monomer is selected from the group consisting of isooctyl acrylate, cyclic trimethylolpropane formal acrylate, phenoxybenzyl acrylate, trimethylcyclohexyl acrylate, isobornyl acrylate, benzyl acrylate, lauryl acrylate, isodecyl acrylate, phenoxyethyl acrylate, tetrahydrofurfuryl acrylate, ethoxy ethoxyethyl acrylate, stearyl acrylate, hydroxyethyl acrylate, hydroxypropyl acrylate, acrylic morpholine, vinyl ether, vinyl ester, N-vinyl-2-pyrrolidone, and N-vinylcaprolactam.

8. The ink composition of claim 1, wherein the di- or more functional radiation curable monomer is selected from the group consisting of ethylene glycol diacrylate, hexanediol diacrylate, triethylene glycol diacrylate, tripropylene glycol diacrylate, dipropylene glycol diacrylate, tetraethylene glycol diacrylate, neopentyl glycol diacrylate, tricyclodecane dimethanol diacrylate, polyethylene glycol 400 diacrylate, trimethylolpropane triacrylate, ethoxylated trimethylolpropane triacrylate, glycerol triacrylate, and pentaerythritol triacrylate.

9. The ink composition of claim 1, wherein the ink composition has viscosity of 40 cps or less at room temperature.

10. The ink composition of claim 1, wherein the ink composition has a surface tension of 20 to 50 dyne/cm.

11. A method for manufacturing a printed steel sheet, the method comprising:
jetting the ink composition of claim 1 onto a steel sheet; and
forming a coating film by curing the jetted ink composition.

12. A printed steel sheet comprising:
a steel sheet; and
a coating film formed on the steel sheet from the ink composition of claim 1.

13. An ink composition for a steel material, comprising:
10 parts by weight to 30 parts by weight of a mixture of a urethane acrylate oligomer and an epoxy acrylate oligomer, wherein the urethane acrylate oligomer and the epoxy acrylate oligomer are mixed in a weight ratio of 2:1 to 10:1, and the epoxy acrylate oligomer has a weight-average molecular weight of 500 to 2,000;
65 parts by weight to 80 parts by weight of a radiation curable monomer that is a mixture of a monofunctional radiation curable monomer and a di- or more functional radiation curable monomer, wherein the monofunctional radiation curable monomer and the di- or more functional radiation curable monomer are mixed in a weight ratio of 6:1 to 50:1;
1 part by weight to 10 parts by weight of a photoinitiator; and
0.01 part by weight to 10 parts by weight of an adhesion promoter.

14. The ink composition of claim 13, wherein the urethane acrylate oligomer has a weight-average molecular weight of 500 to 12,000.

15. The ink composition of claim 13, wherein the urethane acrylate oligomer is aliphatic urethane acrylate.

16. The ink composition of claim 13, wherein a number of functional groups in the urethane acrylate oligomer is less than or equal to 3.

17. The ink composition of claim 13, wherein the monofunctional radiation curable monomer is selected from the group consisting of isooctyl acrylate, cyclic trimethylolpropane formal acrylate, phenoxybenzyl acrylate, trimethylcyclohexyl acrylate, isobornyl acrylate, benzyl acrylate, lauryl acrylate, isodecyl acrylate, phenoxyethyl acrylate, tetrahydrofurfuryl acrylate, ethoxy ethoxyethyl acrylate, stearyl acrylate, hydroxyethyl acrylate, hydroxypropyl acrylate, acrylic morpholine, vinyl ether, vinyl ester, N-vinyl-2-pyrrolidone, and N-vinylcaprolactam.

18. The ink composition of claim 13, wherein the di- or more functional radiation curable monomer is selected from the group consisting of ethylene glycol diacrylate, hexanediol diacrylate, triethylene glycol diacrylate, tripropylene glycol diacrylate, dipropylene glycol diacrylate, tetraethylene glycol diacrylate, neopentyl glycol diacrylate, tricyclodecane dimethanol diacrylate, polyethylene glycol 400 diacrylate, trimethylolpropane triacrylate, ethoxylated trimethylolpropane triacrylate, glycerol triacrylate, and pentaerythritol triacrylate.

19. The ink composition of claim 13, wherein the ink composition has viscosity of 40 cps or less at room temperature.

20. The ink composition of claim 13, wherein the ink composition has a surface tension of 20 to 50 dyne/cm.

* * * * *